United States Patent Office 3,606,357
Patented Sept. 20, 1971

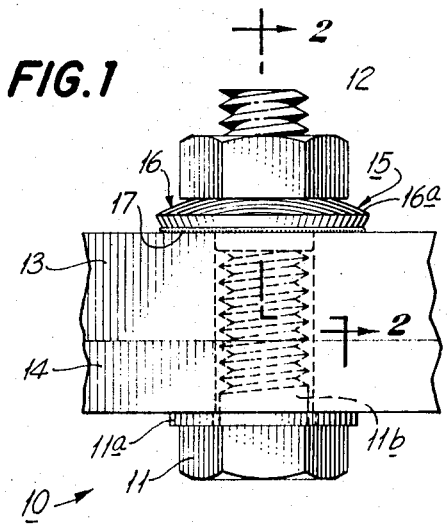
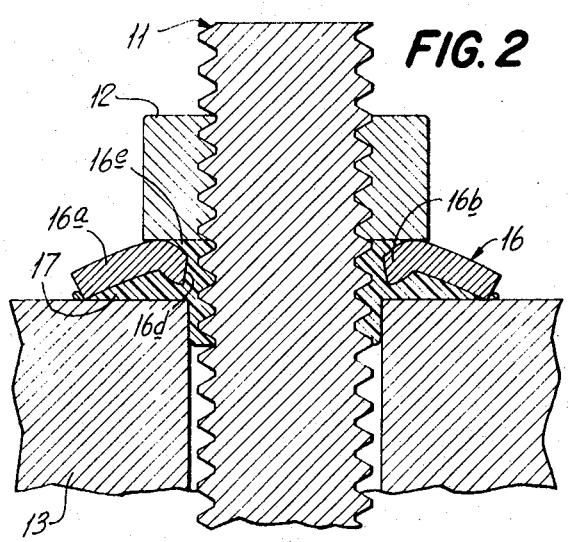
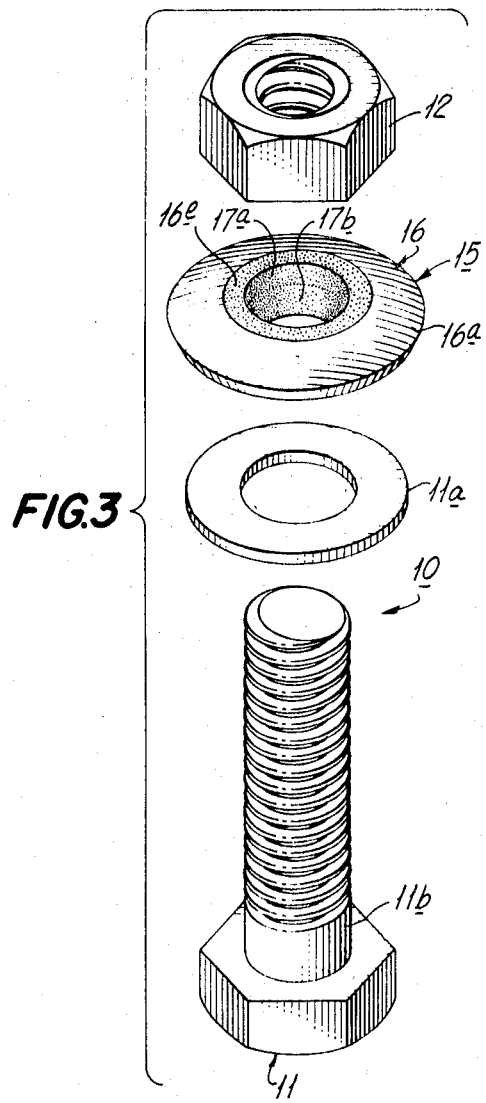
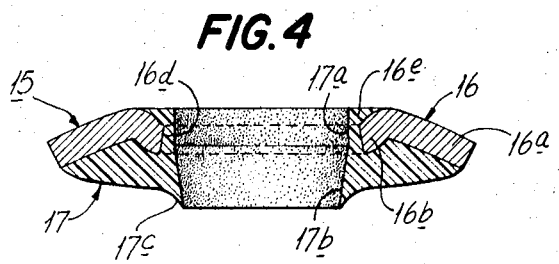
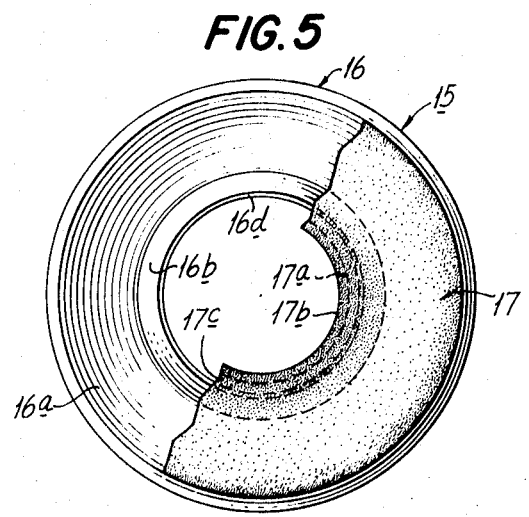

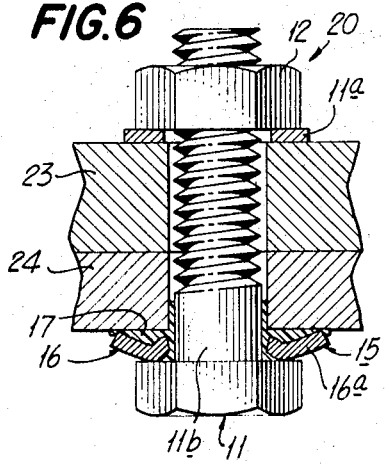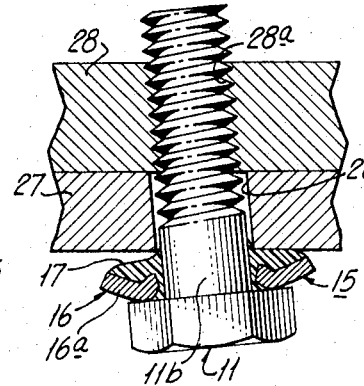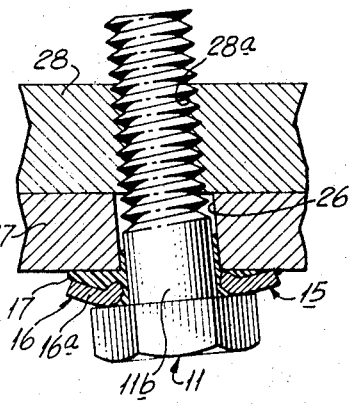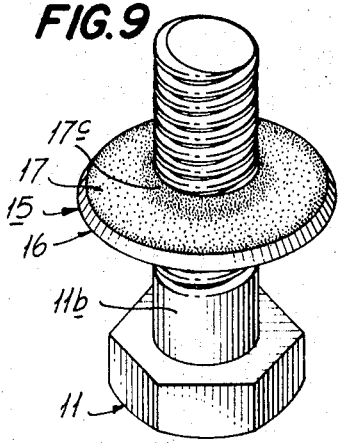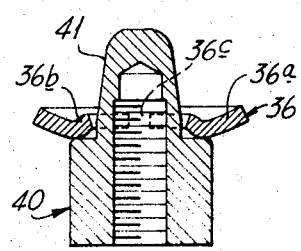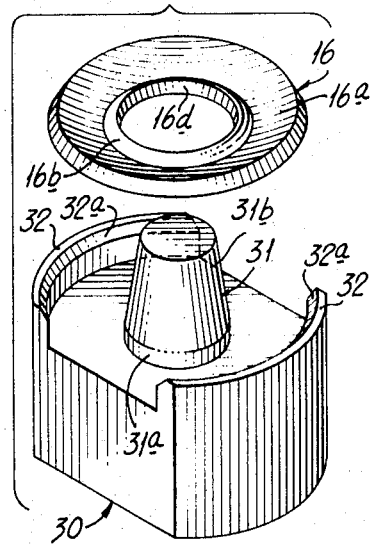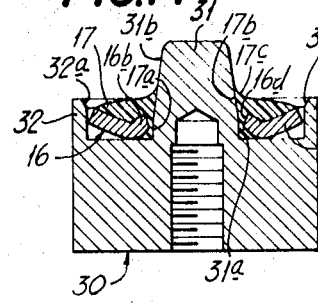

3,606,357
SELF-SEALING AND ALIGNING MEMBER
John L. Yonkers, 2030 Sunset Ridge Road,
Northbrook, Ill. 60062
Filed June 24, 1968, Ser. No. 739,314
Int. Cl. F16b *35/00, 43/00;* F16j *15/00*
U.S. Cl. 277—166
10 Claims

ABSTRACT OF THE DISCLOSURE

There is provided a self-sealing and aligning member including a generally concave washer provided with an inwardly turned flange, and a ring-shaped plastic filler joined to the concave side of the washer and defining a generally arcuate outer surface.

---

This invention relates to an improvement in self-sealing and aligning members for use with bolts, nuts, and other fasteners.

Heretofore difficulty has been experienced in obtaining proper sealing and seating of bolts and nuts through such materials as corrugated sheet, or where materials have been field drilled with slight misalignment of the hand-held drill. It has heretofore been commercially known to provide nuts, bolts and similar fastening devices with a plastic filler or sealer deposited on the head surface of the nut or bolt to provide for sealing of the nut or bolt with the fastened member. Such deposit of sealer has not been entirely satisfactory. Moreover, it has been proposed to provide a self-sealing and aligning member for use with a fastener wherein the self-sealing member comprises a generally arcuate washer engageable with the surface of the fastener and provided with a ring-shaped plastic filler joined to the washer. Such a self-sealing and aligning member is described and claimed in the applicant's copending application, Ser. No. 573,944, filed Aug. 22, 1966. The present application is an improvement over the self-sealing and aligning member defined therein.

Accordingly it is an object of the present invention to provide a new and improved self-sealing and aligning member.

A further object of the present invention is to provide a new and improved self-sealing and aligning washer for use with nuts, bolts and like fasteners.

Yet another object of the present invention is to provide a self-sealing and aligning member which may be used with standard commercial bolts, nuts or like fasteners.

Yet a further object of the present invention is the provision of a self-sealing and aligning member which may be produced economically in large quantities.

Further objects and advantages of the present invention will become apparent as the following description proceeds and the features of novelty which characterize the invention will be pointed out with particularity in the claims annexed to and forming a part of this specification.

In accordance with these and other objects there is provided an improved self-sealing and aligning member or washer unit for use with a fastener such as a bolt or nut. The improved washer unit comprises a generally concave washer provided with an inwardly turned inner flange, and a ring-shaped plastic filler is joined to the concave side of the washer to define a generally arcuate outer surface. Preferably the washer and filler are provided with aligned openings adapted to receive the stem of a fastener, and the opening in the washer is larger than the opening in the filler so that the material of the filler extends into the opening of the washer and projects beyond the washer around the inwardly turned flange. The washer may be formed of soft metal such as aluminum or galvanized metal to provide for deformation of the washer under the more severe misalignment conditions.

Advantageously it has been found that a washer unit according to the present invention will accommodate misalignment of the component parts, such as where the bolt hole has been drilled crookedly through the members, or where self-tapping screws are used; and at the same time the washer unit will provide a good hermetic seal between the fastener and the fastened members. Moreover commercially available bolts and nuts may be used with the washer unit. Advantageously the washer unit may be economically produced in large quantities.

For a better understanding of the present invention, reference may be had to the accompanying drawing wherein:

FIG. 1 is a fragmentary view of members secured together with a fastener device including a self-sealing and aligning member according to the present invention;

FIG. 2 is a fragmentary sectional view, drawn to a larger scale, of the structure of FIG. 1 taken along line 2—2 of FIG. 1;

FIG. 3 is an exploded isometric view of the fastener device of FIG. 1;

FIG. 4 is a cross sectional view of a washer unit according to the present invention illustrated in FIGS. 1 through 3;

FIG. 5 is a bottom, broken away sectional view of the washer unit of FIG. 4;

FIG. 6 is a fragmentary view of members secured together with a fastener device according to the present invention wherein the sealing washer is placed under the head of the bolt;

FIG. 7 is a fragmentary view of members fastened together with a fastener driving device wherein there is misalignment between the fastener device and the members;

FIG. 9 is a perspective view of a bolt and washer unit according to the present invention;

FIGS. 10 and 11 illustrate steps in the manufacture of the improved washer unit; and FIGS. 12 through 15 illustrate steps in the manufacture of another embodiment of a washer unit according to the present invention.

Referring now to the drawings, and particularly to FIGS. 1 through 5, there is illustrated a fastener 10, here shown as a bolt 11 and nut 12, securing together two plates 13 and 14, and of conventional commercial design. A self-sealing and aligning member or washer unit 15 according to the present invention is positioned under the nut. A conventional washer 11a is illustrated under the head of the bolt 11, but a washer unit according to the present invention may be used under the head of the bolt if desired as shown in FIG. 6. The washer unit 15 includes a generally concave washer 16 having a somewhat frusto-conical portion 16a (FIGS. 2 and 4) and an inwardly turned inner flange 16b. The washer 16 is preferably formed of soft metal such as aluminum or galvanized iron to permit deformation of the washer when tightened against irregular or misaligned surfaces. A ring-shaped plastic filler 17 is joined to and may be formed in place on the concave lower surface of the washer 16. Any curable resilient material may be employed for the filler 17, and it has been found that polyvinyl chloride performs satisfactorily. The filler 17, as best illustrated in FIG. 5, projects a slight distance below the surface of the washer 16 to define a generally arcuate outer surface. Both the washer 16 and the filler 17 are provided with aligned openings 16d and 17a, FIG. 7, for receiving a stem portion 11b of the bolt 11. The opening 16d in the washer 16 is somewhat larger than the opening 17a in the polyvinyl chloride so that a material of the filler 17 extends into the opening 16c of the washer 16, some of the filler material flowing around the flange 16b onto the opposite or convex surface of the washer 16 as illustrated at 16e. The other end of the opening 17a tapers inwardly, as shown at 17b, FIG. 4, so that the washer unit 15 will slip freely on the stem lip of a bolt, as illustrated in FIG. 9, but will resist separation or removal therefrom. Thus the member washer unit 15 may be preassembled with a bolt without slipping off in shipping and handling.

FIG. 2 illustrates the action of the washer unit 15 when tightened against a surface. The metal washer 16 will seat both against the mating surface of the nut 12 and against the surface of the plate 13. Such seating will occur even though there might be slight misalignment between the components. Moreover, and quite importantly, the filler 17 will fill the threads in the area of the washer unit 15. The upper edge of the filler member will extrude and seat against the nut 12, and with the overflowing portion 16a of the filler, will form a hermetic seal between the components.

FIG. 6 illustrates a use of the washer unit wherein the washer unit is placed under the head rather than the nut of the bolt. More specifically in FIG. 6 there is illustrated a fastener 20, here shown as the bolt 11 and the nut 12, of conventional commercial design securing together two plates 23 and 24. A washer unit 15 according to the present invention is positioned under the head of the bolt 11. The conventional washer 11a is illustrated under the nut 12. The washer unit 15, as heretofore described, includes the generally concave washer 16 and the ring-shaped plastic filler 17. The washer unit 15 functions in like manner to seal around the shank 11b of the bolt 11 as heretofore described in the embodiment of FIGS. 1 through 5.

FIGS. 7 and 8 illustrate an application of the washer unit to an installation wherein there is misalignment between the facing surface of the plates and the head of the fastener. More specifically, referring to FIGS. 7 and 8, there is illustrated the bolt 11 extending through an aperture 26 in a plate 27 and threaded directly into a tapped opening 28a in a second plate 28. The washer unit 15 is positioned under the head of the bolt 11, sealing against the outer surface of the plate 27, around the stem portion 11b of the bolt 11, and against the undersurface of the head of the bolt 11, accommodating the misalignment between the bolt 11 and the surface of the plate 27.

FIG. 9 illustrates the assembly of the washer unit 15 onto the stem portion 11a of the bolt 11. The washer unit 15 is readily assembled thereon securely without danger of disassembly. Specifically the washer unit 15 is assembled onto the stem portion 11a with the washer 16 thereof facing toward the head of the bolt 11 and the plastic filler 17 extending away from the head of the bolt 11. As heretofore described, the opening 17a includes the inward taper 17b, FIG. 4, terminating in a projecting lip 17c. Because of the taper 17b and lip 17c, the bolt 11 may be readily slipped through the washer unit 15 in the direction illustrated, but the washer 15 resists removal from the bolt or movement of the bolt in the opposite direction.

Referring now to the mode of making the self sealing and aligning member 15, as illustrated in FIGS. 10 and 11, the arcuate washer 16 is placed in a fixture 30 with the concave side thereof extending upwardly and spaced over a Teflon stud or mandrel 31. Preferably the underside of the underside of the washer 16 has been sprayed or otherwise coated with a silicone lubricant or release agent to provide for its removal from the fixture 30. The fixture 30 includes opposed segmented circumferentially extending flanges 30 adapted to receive the outer edge of the washer 16 so as to space the inner edge thereof from the mandrel 31. The upper inner edge of the flanges 32 may be chamfered, as illustrated at 32a, to facilitate assembly of the washer 16. The flanges 32 serve to center the washer 16 with reference to the mandrel 31.

Moreover in order to form the taper 17b on the inner opening 17a, the mandrel 31 includes a lower cylindrical portion 31a and an upper tapered portion 31b. Thereafter when the plastic filler 17, FIG. 11, is deposited on top of the washer 16, the filler 17 will flow between the mandrel 31 and the edge of the washer 16 so that some of the filler material will form the thin film 16e on the underside or convex side of the washer 16. Advantageously the plastic filler 17 may be squirted from a gun while the fixture 30 and mandrel 31 are rotated. Thereafter the plastic filler material 17 is cured as required.

FIGS. 12 through 15 illustrate a modified form of self sealing and aligning member or washer unit 35 designed to facilitate manufacture thereof. The washer unit 35, as heretofore described, includes a concave washer 36, with a plastic filler 37 on its concave surface. The washer unit 35 is identical to the washer unit 15 heretofore described, except for the addition of a plurality of spaced inwardly extending positioning lugs 36c, FIG. 10, formed contiguous with an inner flange 36b. During manufacture the arcuate washer 36 is positioned on a fixture 40 with the concave side thereof extending upwardly and spaced over a Teflon stud or mandrel 41. Preferably the underside of the washer 36 has been sprayed or otherwise coated with a silicone lubricant or release agent to provide for its removal from the fixture 40. Thereafter the plastic filler 37 is deposited on top of the washer 36. The lugs 36c center the washer 36 on the mandrel 41. Since the opening in the washer 36 is somewhat larger than the diameter of the mandrel 41, the filler material will flow between the stud and the edge of the washer 36 so that some of the filler material may form the thin film on the underside or convex side of the washer 16. Advantageously the plastic filler 17 may be squirted from a gun while the fixture 40 and mandrel 41 are rotated.

After depositing of the plastic material on the washer, plastic filler material on the washer 15 or 35 is cured as required, for example in the case of polyvinyl chloride by subjecting the filler to exposure of heat lamps 42, FIG. 13.

Although the present invention has been described by reference to different embodiments thereof, it will be apparent that numerous other modifications and embodiments may be devised by those skilled in the art. It is understood, for example, that the self-sealing and aligning members 15 may be used in pairs. It is therefore intended by the appended claims to cover all modifications and embodiments which fall within the true spirit and scope of the present invention.

What is claimed as new and desired to be secured by Letters Patent of the United States is:

1. A self-sealing and aligning member for use with a fastener and comprising a generally concave washer having a concave side and a convex side and provided with an outer edge and a central opening, said washer being provided with a turned inner flange along said central opening inclined inwardly toward said concave side, and a ring-shaped convex plastic filler joined to said concave side of said washer and defining a generally arcuate outer surface extending from said outer edge of washer to said central opening thereof.

2. A self-sealing and aligning member as set forth in claim 1 wherein said washer and filling are provided with aligned openings adapted to receive the stem of a fastener, the opening in said washer being larger than the opening in said filler.

3. A self-sealing and aligning member as set forth in claim 2 wherein the material of said filler extends into the opening of said washer.

4. A self-sealing and aligning member as set forth in claim 1 wherein said filler is formed of polyvinyl chloride.

5. A self-sealing and aligning member as set forth in claim 1 wherein said washer is generally frusto-conical in shape.

6. A self-sealing and aligning member as set forth in claim 1 wherein said filler projects beyond said washer around said flange.

7. A self-sealing and aligning member as set forth in claim 1 wherein said washer is formed of soft metal.

8. A self-sealing and aligning member as set forth in claim 1 wherein said filler is cured in place in said washer.

9. A self-sealing and aligning member as set forth in claim 1 wherein said washer is provided with a plurality of arcuately spaced inwardly extending positioning lugs extending contiguous with said flange.

10. A self-sealing and aligning member as set forth in claim 2 wherein the surface of said filling opening remote from said washer is tapered inwardly.

References Cited

UNITED STATES PATENTS

| | | | |
|---|---|---|---|
| 2,795,444 | 6/1957 | Nenzell | 277—180 |
| 2,995,782 | 8/1961 | Heller | 277—166UX |
| 3,286,577 | 11/1966 | Wiedner, Jr. | 85—1JP |
| 3,422,721 | 1/1969 | Yonkers | 85—1JP |

SAMUEL B. ROTHBERG, Primary Examiner

U.S. Cl. X.R.

277—235; 85—1